United States Patent Office 2,784,456
Patented Mar. 12, 1957

2,784,456

HEAT-SHRINKABLE FILM AND PROCESS FOR PRODUCING THE SAME

Thomas Aloysius Grabenstein, Buffalo, N. Y., assignor to E. I. du Pont de Nemours & Company, Wilmington, Del., a corporation of Delaware No Drawing. Application July 7, 1953, Serial No. 366,627

13 Claims. (Cl. 18—48)

This invention relates to heat-shrinkable sheets of polyethylene terephthalate and, more particularly, to heat-shrinkable sheets adaptable for fabrication into heat-shrinkable bands, and a process for producing the same.

Heat-shrinkable sheets of synthetic thermoplastic polymers such as rubber hydrochloride, vinyl resins, etc., are extensively employed for wrapping articles of various shapes by enclosing an article within a heat-shrinkable sheet, sealing the sheet around the article, and thereafter shrinking the sheet tightly around the article by subjecting the package to elevated temperatures. Food products, in particular, have been wrapped in this manner, such food products including poultry, fruits, various red meats, sausage and similar products. Heretofore, however, little progress has been made in fabricating heat-shrinkable bands, i. e., to be employed as a secondary seal for various types of bottled products, such as wines, liquors, soft drinks, fruits, jellies, seafoods, chemicals, pharmaceuticals, etc. In today's markets, the cellulosic type of band or seal, e. g., regenerated cellulose bands, are widely used in the wine and liquor industries and to a considerable extent in the pharmaceutical industry. However, the extensive use of regenerated cellulose bands in the soft drink fields and in the food packaging field is limited because of the water sensitivity of the regenerated cellulose bands. Furthermore, cellulose bands are highly vulnerable to attack by molds and fungi; and such bands must be shipped in a wet condition in special solutions which prevent attack by molds and fungi.

Attempts to fabricate heat-shrinkable bands by directly extruding various polymeric thermoplastic materials into tubing, and then stretching to form a heat-shrinkable tube which may be cut into individual bands, have not been successful heretofore because of the difficulties involved in uniformly stretching a formed tube to produce bands having the desired heat-shrinkage pattern, i. e., the proper amount of shrinkage in the longitudinal direction and radial direction. Furthermore, it has been extremely difficult to duplicate results, even in cases where a tube having the desired heat-shrinkage pattern has been produced.

An object of the present invention, therefore, is to prepare and provide a heat-shrinkable film or sheet of a highly polymeric linear polyethylene terephthalate, which film or sheet may be readily formed into a heat-shrinkable tube or band. A further object is to provide a process of preparing a heat-shrinkable sheet of polyethylene terephthalate, the heat-shrinkable sheet possessing a heat-shrinkage pattern which is highly desirable for fabrication into heat-shrinkable tubes or bands. A still further object is to prepare a heat-shrinkable band of polyethylene terephthalate, the band being highly useful for seals for bottles containing beverages, food products, pharmaceuticals, etc. Other objects will be apparent from the description of the invention which follows.

The present invention resides in the discovery that by stretching film of polyethylene terephthalate, or modified polyethylene terephthalate, under the particular conditions hereinafter specified, there results a film having an optimum heat-shrinkage pattern and a low degree of crystallinity which is especially suited for conversion into heat-shrinkable tubes or bands useful as above outlined.

Briefly stated then, my invention comprises preheating an amorphous film of polyethylene terephthalate or modified polyethylene terephthalate in air or other inert gaseous atmosphere maintained at a temperature within the range of from about 110° C. to about 150° C., stretching said film about 2 × (two times its original dimension) in the transverse direction, i. e., in a direction perpendicular to the direction in which the film has been extruded, calendered, cast, etc., in air maintained at a temperature within the range of from about 85° C. to about 135° C., and thereafter permitting the film to cool while maintaining it under stretching tension. The resulting film, when subjected to a temperature in excess of about 80° C., will shrink at least 30% in the direction in which it has been stretched, and no more than 15% in a direction perpendicular to the direction of stretch, and, in addition, will be not more than 5% crystalline. Heat-shrinkable bands and like structures may be made from such film by any desired expedient, such as folding the film along a line normal to the direction of stretch, heat-sealing the edges of the folded film to form tubing, and cutting the tubing transversely to form bands.

The present invention is chiefly concerned with heat-shrinkable sheets and bands fabricated from amorphous polyethylene terephthalate, although satisfactory sheets and bands may be fabricated from polyethylene terephthalates which have been modified with small amounts of acids, or esters thereof, from the group consisting of isophthalic acid, bibenzoic acid, sebacic acid, adipic acid, and hexahydro terephthalic acid. The production of polyethylene terephthalate is fully disclosed in U. S. Patent No. 2,465,319 to Whinfield and Dickson. From a commercial standpoint, the most attractive process for the production of polyethylene terephthalate comprises carrying out an ester interchange between ethylene glycol and dimethyl terephthalate to form bis-2-hydroxy-ethyl terephthalate which is polymerized to polyethylene terephthalate under reduced pressure and at elevated temperatures. In such a reaction, various modified polyethylene terephthalates may be formed by reacting ethylene glycol, dimethyl terephthalate and a small quantity, e. g., 10–15%, of a low alkyl ester of one of the acids mentioned above.

To insure the optimum shrinkage pattern, it is requisite that the film be preheated in air or equivalent inert gaseous atmosphere maintained at a temperature within the range of from about 110° to about 150° C., and, preferably, within the range of 120–140° C. If the preheating step is omitted, it has been found that the shrinkage value of the resulting film is not reproducible in the sense that the variations in shrinkage of the stretched film from run to run exceed those that can be tolerated in commercial practice.

Likewise, the temperature to which the film is subjected during stretch must be maintained within a reasonably narrow range, namely, within the range of from about 85° C. to about 135° C. If the stretch is carried out at a temperature below about 85° C., assuming that the film has been preheated in air at a temperature of from 110° C. to 150° C., the shrinkage pattern of the resulting film cannot be reproduced within satisfactory limits. On the other hand, if the film is subjected to too high a temperature prior to or during stretch, the resulting film is crystallized to an undesirably high degree; and such elevated temperatures may cause plastic flow of the film. Preferably, the stretch should be carried out in air at a temperature of from 105° C. to 120° C. It is to be understood that the temperatures at which the film is preheated and at which the film is stretched are ambient temperatures, i. e., the temperature of the surrounding atmosphere; and these temperatures do not represent the exact temperature of the film. Actually, the film temperature during the stretching step will rise somewhat owing to heat generated within the film during stretching.

The degree of stretch is also a critical factor of the invention. Film stretched either substantially more or less than twice its original dimension under the temperature conditions hereinabove specified will have insufficient shrinkage; and, in general, the differential between the shrinkage in the direction of stretch and the shrinkage in the direction normal thereto will not be sufficiently great if the film is to be converted into heat-shrinkable bands. As is set forth above, the most desirable pattern for a heat-shrinkable band for use in secondary seals should be at least 30%, and, preferably, at least 40%, in the radial direction, so that the band will fit snugly around the neck or top of the bottle or jar, and should be no greater than about 15% and, preferably, between 5–10% in the longitudinal direction so that the length of the band will not be excessively reduced.

An additional critical factor of the invention, and one that inherently results when the herein specified temperature and stretch conditions are observed, is a very low degree of crystallinity. The crystallization of the stretched film should not exceed 5%, as determined by the density gradient method, and, preferably, should not exceed 3%. Film having a higher degree of crystallinity is not readily heat-sealable; and the seals when made are brittle, weak, and poor in appearance due to puckering of the film at the seal. Furthermore, less crystalline films exhibit greater receptivity for, and adhesion to various standard types of printing inks.

Any of the known methods for stretching the film in accordance with this invention and for converting the resulting heat-shrinkable film into heat-shrinkable sheets, tapes, bags, tubing, or bands may be employed. Thus, heat-shrinkable bands may be made in a continuous process by transversely stretching freshly extruded amorphous film 2 × between two opposed sets of traveling tenter clamps allowing the stretched film to cool under tension, continuously folding the stretched film, continuously sealing the edges of the folded film to form continuous tubing and severing the tubing transversely into band lengths. A number of heat-sealing techniques may be employed to form tubing from flat sheeting, these techniques including sealing with a hot wire, high frequency electronic sealing, radiant sealing, sealing by application of an open flame, and sealing with various solvents and standard adhesives. For example, by employing various hot wire sealers or by clamping the edges of the film together and applying an open Bunsen burner flame to the edges, heat seals which have a tenacity substantially equivalent to the tenacity of the sheet itself have been obtained.

Because of their low degree of crystallinity, heat-shrinkable polyethylene terephthalate structures of the present invention may be suitably colored and/or printed upon for the purpose of individualizing and enhancing the appearance of the bottles, containers, etc. on which the structures, e. g., bands, are applied. For example, rotogravure and aniline flexographic type printing inks may be employed for coloring the heat-shrinkable polyethylene terephthalate tubes, bands, and like structures, of the present invention. Printing may be used to form sheets, tubes, and bands of solid background colors with or without various indicia imprinted thereon. Furthermore, various indicia and/or designs, may be imprinted directly on the uncolored sheet, tube or band.

Shrinkage of the bands and the like is most conveniently effected by the application of hot air, for example, by impinging hot air at 100° C. against the band. Usually, when hot air is used, a higher temperature is more efficient for rapid shrinking, the particular temperature being dependent upon the air mass and velocity. Shrinking may also be effected by immersing the applied band in boiling water, or by employing radiant heat. While higher heat-shrinking temperatures may be employed, a temperature of 100° C. has proven to be highly satisfactory. Furthermore, the use of substantially higher temperatures may adversely affect the economics of any continuous heat-shrinking process.

For the purpose of insuring the tamperproofness of the heat-shrinkable bands of the present invention, it is within the scope of the present invention to apply various adhesive coatings to the sheets or inner surfaces of the bands in order to improve the adhesion of the band to the neck of the bottle or surface of the container in order to make the band entirely resistant to twisting. Such adhesive compositions may be substantially non-tacky at room temperature, but may become adhesive or sticky at the elevated temperatures employed to shrink the band.

The following examples will serve to further illustrate the principles and practice of the present invention.

In the following examples, amorphous unstretched polyethylene terephthalate film, 0.005" in thickness, was stretched in the transverse direction (TD), i. e., in a direction transverse to the direction in which the film was extruded. The film was preheated in air between 110° and 150° C. and then stretched in the TD at a temperature within the range 95–110° C. Thereafter, the film under tension was permitted to cool to a temperature at least below 40° C. before tension was released. Films so stretched were subjected to temperatures of 100°, 110°, 125° and 150°; and the shrinkage pattern, i. e., the extent to which the film shrinks in the machine direction (MD) and TD, was measured for each at each of the temperatures indicated.

The results are tabulated in Table I.

TABLE I

*Percent shrinkage of one-way transverse direction (TD) stretched polyethylene terephthalate film*

| Example | Transverse Direction Tensilization | 100° C. | | 110° C | | 125° C. | | 150° C. | |
|---|---|---|---|---|---|---|---|---|---|
| | | MD | TD | MD | TD | MD | TD | MD | TD |
| 1 | 1.5X | 28 | 28 | 30 | 30 | 30 | 30 | 30 | 30 |
| 2 | 2.0X | 8 | 48 | 12 | 48 | 15 | 48 | 15 | 48 |
| 3 | 2.5X | 17 | 32 | 20 | 22 | 20 | 22 | 17 | 25 |
| 4 | 3.0X | 15 | 20 | 13 | 25 | 12 | 20 | 10 | 21 |

As stated hereinbefore, it has been determined with respect to heat-shrinkable seals for beverage and food-containing bottles, etc., that the ideal shrinkage pattern is at least 30%, preferably at least 40%, in one direction, and no greater than 15%, preferably between 5–10%, in the direction perpendicular to the first direction. An inspection of the results tabulated in Table I shows that Example 2 meets these specifications. Furthermore, the film stretched 2 × in the TD, under the conditions indicated, had a degree of crystallinity of less than 5%, and in most cases less than 3%.

The general appearance of edge heat seals made with heat-shrinkable sheets stretched 2 × in the TD was outstanding; that is, the seals were substantially smooth and uniform. Based upon the average of 17 samples of polyethylene terephthalate film stretched 2 × in the TD, in accordance with the process of the present invention, the average crystallinity was less than 3%. The measurement of crystallinity was carried out in accordance with the density gradient method as follows:

The density gradient method of measuring the density of a polyethylene terephthalate film may be applied to any polymeric film, fiber or solid, provided that the test sample is not affected by the solvent system used, i. e., is not dissolved in or does not absorb solvent. For polyethylene terephthalate film, a carbon tetrachloride $$\left(d\frac{20}{4}=1.595\right)$$

and n-heptane $$\left(d\frac{20}{4}=0.684\right)$$

solvent system is employed. This method of determining the density of polyethylene terephthalate film depends upon the fact that pairs of miscible liquids of different densities, if only partially mixed in a vertical tube, form a column in which a vertical and nearly linear density gradient from the top to the bottom of the tube results. By diffusion, uniform concentration, and, therefore, density are only very slowly reached, probably over a period of several months; and thus, a gradient of any desired magnitude can be maintained in a stable condition for several weeks by partially mixing organic liquids of the proper density.

Since the density gradient resulting from the partial mixing of carbon tetrachloride and n-heptane is approximately 0.05 unit over a 40–50 centimeter length, and since the density of polyethylene terephthalate film may vary from 1.32 to 1.42, it may be necessary to prepare several tubes of solution. With respect to the density of polyethylene terephthalate film, an amorphous film has a density of about 1.32 at 30° C.; and X-ray studies indicate a density, calculated from the dimensions of a triclinic, unit cell, of about 1.47 grams per cc. for the theoretically pure crystalline polymer. As a general indication of the degree of crystallinity of polyethylene terephthalate film after stretching in the machine direction (3 ×) at 80–90° C., the degree of crystallinity is about 10–14%. When this film is stretched thereafter 3 × in the transverse direction at 95°–110° C., the degree of crystallinity is about 20–25%. Upon heat-setting this film at 200° C., the crystallinity is about 40–42%.

The following examples illustrate the preferred temperature conditions for carrying out transverse direction stretching of polyethylene terephthalate to double the original film width. Table II contains specific data with respect to the temperature at which the film is preheated and the temperature at which transverse direction stretching is effected. In addition, the table indicates the resulting film gauge (thickness) and the shrinkage pattern when the film is subjected to 100° C. The stretching process was carried out by conducting an amorphous unstretched film of polyethylene terephthalate into a preheating air oven, and thereafter into a tentering apparatus comprising two continuous chains having tenter clips attached at intervals, the chains, and consequently the tenter clips, diverging as the film is pulled in the machine direction. The tentering apparatus is enclosed in an air oven, and transverse stretching is carried out at a predetermined temperature. The stretched film is thereafter conducted from the oven and cooled at room temperature. In each example, the film was stretched at the rate of 25 yards per minute.

The data presented in the following table illustrate various temperature ranges within which the polyethylene terephthalate may be stretched in air 2 × in the TD and still obtain the desired shrinkage pattern. Furthermore, the data illustrate substantial duplication when the film is preheated and then stretched within the preferred temperature ranges, that is, preheated in air between 110° C. and 150° C., and stretched in an atmosphere maintained between 85° C.–135° C., and preferably between 105° C. and 120° C. It is to be understood that the temperatures at which the film is preheated and at which the film is stretched are ambient temperatures, and these temperatures do not represent the exact temperature of the film. Actually, the film temperature during the stretching process will rise somewhat owing to the heat generated within the film during stretching. The last four examples in Table II illustrate the appreciable decrease in the amount of transverse direction shrinkage when the film is not preheated in an ambient temperature at least as high as 110° C. Generally, when attempts are made to stretch the film in air at temperatures lower than about 85° C., assuming that the film has been preheated in air at a temperature within the preferred range, i. e., 110°–150° C., the shrinkage pattern of the resulting film is not reproducible. The employment of higher preheating and stretching temperatures is not necessary, and the use of such higher temperatures would result in the formation of a crystalline film, this being highly undesirable as discussed hereinbefore.

TABLE II

| Example | Air Temp. (°C.) Tenter Frame | | Gauge (mil) | Shrinkage Pattern | |
|---|---|---|---|---|---|
| | Pre-Heat | TD Stretch | | MD | TD |
| 5 | 121 | 107 | 2.2 | 8 | 46 |
| 6 | 121 | 107 | 2.4 | 7 | 44 |
| 7 | 121 | 107 | 2.5 | 5 | 46 |
| 8 | 121 | 107 | 1.4 | 13 | 43 |
| 9 | 121 | 107 | 1.9 | 10 | 51 |
| 10 | 121 | 107 | 1.8 | 10 | 51 |
| 11 | 138 | 118 | 2.1 | 7 | 46 |
| 12 | 138 | 118 | 2.3 | 5 | 44 |
| 13 | 138 | 118 | 2.5 | 6 | 41 |
| 14 | 138 | 118 | 2.1 | 6 | 49 |
| 15 | 138 | 118 | 1.9 | 7 | 54 |
| 16 | 138 | 118 | 1.8 | 8 | 51 |
| 17 | 138 | 121 | 1.0 | 4 | 48 |
| 18 | 138 | 121 | 1.1 | 5 | 45 |
| 19 | 138 | 121 | 1.0 | 4 | 47 |
| 20 | 138 | 121 | 1.0 | 2 | 46 |
| 21 | 138 | 121 | 1.0 | 2 | 45 |
| 22 | 138 | 121 | 1.1 | 3 | 46 |
| 23 | 107 | 121 | 0.8 | 6 | 37 |
| 24 | 107 | 121 | 0.8 | 2 | 35 |
| 25 | 107 | 121 | 0.7 | 2 | 36 |
| 26 | 107 | 121 | 0.8 | 3 | 38 |
| 27 | 107 | 121 | 1.1 | 4 | 32 |
| 28 | 143 | 118 | 1.2 | 10 | 42 |
| 29 | 143 | 118 | 1.2 | 4 | 47 |
| 30 | 143 | 118 | 1.0 | 3 | 47 |
| 31 | 143 | 118 | 1.0 | 5 | 50 |
| 32 | 143 | 118 | 1.2 | 4 | 39 |
| 33 | 143 | 118 | 1.2 | 2 | 39 |
| 34 | 141 | 121 | 2.4 | 6 | 33 |
| 35 | 141 | 121 | 2.5 | 6 | 31 |
| 36 | 141 | 121 | 2.2 | 4 | 34 |
| 37 | 141 | 121 | 2.3 | 9 | 32 |
| 38 | 141 | 121 | 2.2 | 8 | 37 |
| 39 | 121 | 121 | 2.6 | 6 | 49 |
| 40 | 121 | 121 | 2.6 | 8 | 49 |
| 41 | 121 | 121 | 2.6 | 8 | 51 |
| 42 | 121 | 121 | 2.5 | 5 | 49 |
| 43 | 121 | 121 | 2.5 | 10 | 49 |
| 44 | 121 | 121 | 2.4 | 4 | 46 |
| 45 | 88 | 93 | 1.2 | 6 | 20 |
| 46 | 88 | 93 | 1.3 | 4 | 20 |
| 47 | 88 | 93 | 0.9 | 2 | 20 |
| 48 | 88 | 93 | 1.1 | 2 | 16 |

Although the preferred polymeric composition for forming into heat-shrinkable sheets and bands is a polymer composed entirely of a composition formed by reacting ethylene glycol and terephthalic acid or a dialkyl ester thereof, it is within the intended purview of the present invention to include modified polyethylene terephthalates, that is, those polyesters formed by reacting glycol, terephthalic acid, or a dialkyl ester thereof, and a small quantity, i. e., no more than 10–15%, of another acid, or dialkyl ester thereof, from the group consisting of isophthalic acid, hexahydro terephthalic acid, bibenzoic acid, sebacic acid and adipic acid.

The heat-shrinkable sheets or films of polyethylene terephthalate conforming to the specifications given hereinbefore are exceptionally outstanding for fabricating into heat-shrinkable tubing or bands for the uses mentioned and other obvious applications of such a shrinkable structure. It should be further emphasized, however, that the particular type of heat-shrinkable sheet of this invention may be employed as a heat-shrinkable binder or wrapper for packaging various bulk items such as poultry, large cuts and slices of meats; for binding together individual packages, i. e., to replace cardboard cartons for holding multiple packages of cigarettes; as a sausage casing; and as a general packaging material for wrapping textiles, lampshades, machine parts, hardware, etc. These heat-shrinkable sheets or films may also be slit into the form of wrapping nd insulating tapes which are heat-shrinkable. Furthermore, heat-shrinkable tubing may be sealed at one end, filled with various products, sealed at the opened end, and shrunken into a compact package. Other general uses for heat-shrinkable sheets, tapes, tubes, and bands include milk bottle hoods, protective coverings for flash bulbs, and as a protective surfacing film for thermal insulation, e. g., as a covering for rock wool batts, etc.

I claim:

1. A process for forming heat-shrinkable film suitable for conversion into heat-shrinkable bands which comprises subjecting film comprised essentially of amorphous polyethylene terephthalate to an inert gaseous atmosphere maintained at a temperature within the range of from about 110° to about 150° C., to preheat the same, stretching the heated film about 2 × in the transverse direction in an inert gaseous atmosphere maintained at a temperature within the range of from about 85° to about 135° C., and thereafter allowing said film to cool while maintaining it under tension to prevent shrinkage.

2. The process of claim 1 wherein the film is preheated at a temperature of from about 120° to about 140° C.

3. The process of claim 1 wherein the film is stretched at a temperature of from about 105° to about 120° C.

4. The process of claim 3 wherein the film is preheated at a temperature of from about 120° to about 140° C.

5. A process for forming heat-shrinkable film suitable for conversion into heat-shrinkable bands which comprises subjecting amorphous polyethylene terephthalate film to an inert gaseous atmosphere maintained at a temperature within the range of from about 110° to about 150° C., to preheat the same, stretching the heated film about 2 × in the transverse direction in an inert gaseous atmosphere maintained at a temperature within the range of from about 85° to about 135° C., and thereafter allowing said film to cool while maintaining it under tension to prevent shrinkage.

6. The process of claim 5 wherein the film is preheated in air at a temperature of from about 120° to about 140° C., and is stretched at a temperature of from about 105° to about 120° C.

7. The process which comprises subjecting a traveling continuous film of polyethylene terephthalate to an inert gaseous atmosphere maintained at a temperature of from about 110° to about 150° C. to preheat the same, stretching said preheated film transversely in an inert gaseous atmosphere maintained at a temperature of from about 85° to about 135° C. to substantially double its original width, and thereafter allowing said traveling film to cool while maintaining it under transverse tension to prevent shrinkage.

8. The process of claim 7 wherein the film is preheated at a temperature of from about 120° to about 140° C.

9. The process of claim 7 wherein the film is stretched at a temperature of from about 105° to about 120° C.

10. The process of claim 9 wherein the film is preheated at a temperature of from about 120° to about 140° C.

11. The process which comprises subjecting a traveling continuous film of polyethylene terephthalate to an inert gaseous atmosphere maintained at a temperature of from about 110° to about 150° C. to preheat the same, stretching said preheated film transversely in an inert gaseous atmosphere maintained at a temperature of from about 85° to about 135° C. to substantially double its original width, and thereafter allowing said stretched film to cool while maintaining it under transverse tension to prevent shrinkage, forming said cooled film in continuous tubing, and cutting said tubing transversely into band lengths.

12. Heat-shrinkable film produced according to the process of claim 1, said heat-shrinkable film being capable, when subjected to a temperature in excess of about 80° C., of shrinking at least 30% in the stretched dimension, and not over 15% in the dimension normal to the stretched dimension, said heat-shrinkable film being not more than 5% crystalline.

13. The heat-shrinkable film of claim 12 in the form of bands.

References Cited in the file of this patent

UNITED STATES PATENTS

| | | |
|---|---|---|
| 2,420,310 | Goodman | May 13, 1947 |
| 2,497,376 | Swallow et al. | Feb. 14, 1950 |
| 2,578,899 | Pace | Dec. 18, 1951 |